United States Patent
Marupaduga

(10) Patent No.: US 10,123,279 B1
(45) Date of Patent: Nov. 6, 2018

(54) METHOD AND SYSTEM FOR CONTROLLING REFERENCE SIGNAL POWER BOOSTING SETTINGS BASED ON POWER HEADROOM AND RETRANSMISSION RATE IN AN LTE NETWORK

(71) Applicant: Sprint Spectrum LP, Overland Park, KS (US)

(72) Inventor: Sreekar Marupaduga, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 15/611,913

(22) Filed: Jun. 2, 2017

(51) Int. Cl.
*H04B 17/00* (2015.01)
*H04W 52/22* (2009.01)
*H04W 88/02* (2009.01)

(52) U.S. Cl.
CPC ....... *H04W 52/228* (2013.01); *H04W 52/225* (2013.01); *H04W 88/02* (2013.01)

(58) Field of Classification Search
CPC ..... H04L 43/08; H04L 5/0005; H04L 5/0048; H04W 52/241; H04W 52/325; H04W 52/346; H04W 52/367
USPC .......... 455/69, 522, 450, 67.1, 452.1, 452.2, 455/13.4, 41.2, 67.11, 67.13, 115.1, 455/151.4; 370/352, 477, 320, 335, 329, 370/469, 474, 252, 465, 311; 713/340
See application file for complete search history.

(56) References Cited

U.S. PATENT DOCUMENTS

| 8,982,791 | B2 | 3/2015 | Liu et al. | |
|---|---|---|---|---|
| 9,755,713 | B2* | 9/2017 | Kim | H04B 7/0421 |
| 2002/0172192 | A1* | 11/2002 | Hunzinger | H04L 1/18 370/352 |
| 2003/0050086 | A1* | 3/2003 | Lee | H04W 52/267 455/522 |
| 2004/0141523 | A1* | 7/2004 | Bhushan | H04L 1/0025 370/469 |
| 2009/0005102 | A1* | 1/2009 | Das | H04W 52/241 455/522 |
| 2009/0238148 | A1* | 9/2009 | Englund | H04W 52/228 370/335 |
| 2010/0103867 | A1* | 4/2010 | Kishiyama | H04W 52/04 370/320 |
| 2011/0167291 | A1* | 7/2011 | Liu | H04W 52/20 713/340 |
| 2012/0113834 | A1* | 5/2012 | Hunzinger | H04B 7/15535 370/252 |
| 2012/0281642 | A1 | 11/2012 | Sambhwani et al. | |

(Continued)

*Primary Examiner* — Tan H Trinh

(57) ABSTRACT

A method and system for controlling a reference signal power boosting settings based on power headroom of one or more wireless devices and retransmission rates within a wireless network. The method of controlling reference signal power boosting at an access node includes monitoring at an access node a received surplus transmit power and retransmission requests of a wireless device over a period of time; determining an average received surplus transmit power and an average retransmission request rate of the wireless device; and modifying a power of a reference signal based on the average received surplus transmit power meeting a first criteria and the average retransmission request rate meeting a second criteria.

20 Claims, 7 Drawing Sheets

(56) References Cited

U.S. PATENT DOCUMENTS

| | | | | |
|---|---|---|---|---|
| 2012/0314640 A1* | 12/2012 | Kim | ........................ | H04L 5/001 |
| | | | | 370/311 |
| 2013/0260815 A1* | 10/2013 | Wang | .................. | H04W 52/343 |
| | | | | 455/522 |
| 2014/0171143 A1* | 6/2014 | Liu | .................... | H04W 52/146 |
| | | | | 455/522 |
| 2014/0241262 A1* | 8/2014 | Novak | ................ | H04W 72/042 |
| | | | | 370/329 |
| 2015/0208265 A1* | 7/2015 | Dalsgaard | ............ | H04B 17/382 |
| | | | | 370/252 |
| 2015/0281017 A1* | 10/2015 | Sarkar | .................... | H04L 43/08 |
| | | | | 370/252 |
| 2015/0358826 A1* | 12/2015 | Wei | .................. | H04W 74/0816 |
| | | | | 370/329 |
| 2016/0270006 A1* | 9/2016 | Choi | .................... | H04W 16/32 |
| 2017/0048039 A1* | 2/2017 | Zhao | .................... | H04L 5/0048 |
| 2017/0257185 A1* | 9/2017 | Hong | .................... | G06F 11/1004 |
| 2017/0295504 A1* | 10/2017 | Yoo | ........................ | H04W 24/02 |
| 2017/0311189 A1* | 10/2017 | Almalfouh | ............ | H04B 17/336 |
| 2017/0325205 A1* | 11/2017 | Zhou | .................. | H04W 72/042 |
| 2018/0013529 A1* | 1/2018 | You | ........................ | H04L 5/0048 |

* cited by examiner

METHOD AND SYSTEM FOR CONTROLLING REFERENCE SIGNAL POWER BOOSTING SETTINGS BASED ON POWER HEADROOM AND RETRANSMISSION RATE IN AN LTE NETWORK

TECHNICAL BACKGROUND

As wireless networks evolve, the demand for high-quality service to a growing number of wireless devices or users increases. Power boosting is transmission mode that has been developed to increase the strength of the reference signal output from the access node. While power boosting increases the reference signal received by wireless devices within a cell or sector of an access node, it also may cause interference to other wireless devices within the cell or sector of the cell, or wireless devices served by other cells. The interference may cause an increase in retransmission rates and a decrease in power headroom of wireless devices, which in turn limits coverage area and reduces reliability. For example, the increased reference signal power may prevent a wireless device from receiving a data signal. In response, the wireless device may request a retransmission of the data and send the request at a higher transmit power, causing further noise or interference within the cell. The increased transmit power may reduce the power headroom of the wireless device.

Additionally, the interference may disrupt handovers, or transfers, of wireless devices from one cell to the next cell. For example, when an access node is power boosting and a wireless device is at or beyond the cell edge or broadcast range of the access node, the wireless device may not be properly handed over to the next, or adjacent, cell due to the power boosting. Therefore, the network may confuse the wireless device as being closer to an access node that is physically further way from the wireless device than another access node. Thus, the interference may extend into and disrupt an adjacent cell. Accordingly, excess use of power boosting may interfere with other wireless devices served by other cells reducing coverage and reliability.

Overview

Embodiments described herein include methods and systems for controlling a reference signal power boosting settings based on power headroom of one or more wireless devices and retransmission rates within a wireless network. An embodiment of the following description includes a method of controlling reference signal power boosting at an access node. The method includes monitoring, at an access node, a received surplus transmit power and retransmission requests of a wireless device over a period of time. The method further includes determining an average received surplus transmit power and an average retransmission request of the wireless device, and modifying a power of a reference signal based on the average received surplus transmit power meeting a first criteria and the average retransmission request rate meeting a second criteria.

Another embodiment described herein includes a method of controlling a node. The method includes monitoring received surplus transmit powers and retransmission requests of a plurality of wireless devices within a sector, and determining an average received surplus transmit power and an average retransmission request rate of the plurality of wireless devices within the sector. In response to the average received surplus transmit power meeting a first criteria and the average retransmission request rate meeting a second criteria, decreasing a transmit power of a reference signal.

In an embodiment, the following description includes an access node. The access node includes a processor configured to power boost a reference signal, determine an average received power headroom and average received retransmission request rate of wireless devices within a sector, and control the power boost of the reference signal within a sector based on the average received power headroom and average received retransmission requests.

DETAILED DESCRIPTION

According to embodiments described herein, an access node may control a reference signal power boosting based on a wireless device power headroom and retransmission rate. Power headroom may be the difference between the current transmit power for a transmission from the wireless device and a maximum uplink transmit power. Retransmission rate may be based on the rate at which one or more wireless devices request a retransmission of data due to a receipt error. The receipt error may be due to receipt of corrupted data. The data may be corrupted due to interference, or signal noise.

Based on the received wireless device power headroom and retransmission requests, an access node may determine whether the received retransmission requests meet a first criteria and the received power headroom meets a second criteria. In response to determining the retransmission rate meets the first criteria and the received power headroom meets the second criteria the access node may modify a power of the power reference signal. For example, in response to the retransmission rate of a wireless devices, or a plurality of wireless devices within a sector of a cell, being low and the power headroom being high, the access node may stop power boosting by reducing the power of the reference signal.

Figure 1:
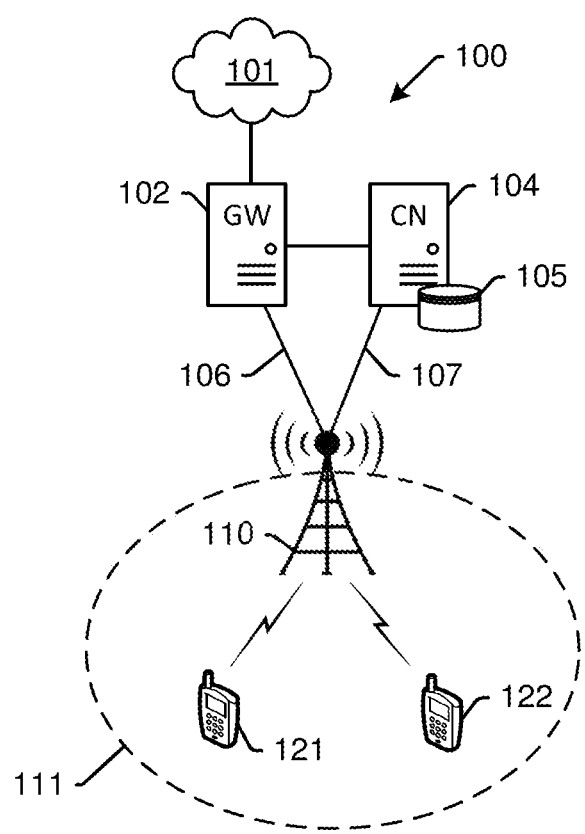
FIG. 1 is a diagram illustrating a system for controlling an access node according to an embodiment.

FIG. 1 depicts a system 100 for transmitting cell-specific reference signals. System 100 comprises a communication network 101, gateway 102, controller node 104, access node 110, and wireless devices 121, 122. Access node 110 is illustrated as having a coverage area 111, with wireless devices 121, 122 being located within coverage area 111 and accessing network services from access node 110. Access node 110 can be any network node configured to provide communication between end-user wireless devices 121, 122 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an embodiment, a macrocell access node can have a coverage area 111 in the range of approximately five kilometers to thirty-five kilometers and an output power in the tens of watts. In other embodiments, access node 110 can be a small access node including a microcell access node, a picocell access node, a femtocell access node, or the like such as a home NodeB or a home eNodeB device. The node may also include one or more remote radio heads disposed on a mast of the node and/or remote from the node. The remote radio head (RRH) may be connected to the node via a wired or wireless connection. The RRH includes one or more antennas connected to the node. By virtue of comprising a plurality of antennas as further described herein, access node 110 can deploy or implement multiple-input-multiple-output (MIMO) modes, such as transmit diversity, open loop spatial multiplexing (OL-SM), closed loop spatial multiplexing (CL-SM), and beamforming.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 121, 122 may be any device, system, combination of devices, or other such communication platform capable of communicating wirelessly with access node 110 using one or more frequency bands deployed therefrom. Wireless devices 121, 122 may be, for example, a mobile phone, a wireless phone, a wireless modem, a personal digital assistant (PDA), a voice over internet protocol (VoIP) phone, a voice over packet (VOP) phone, or a soft phone, a computing platform such as a laptop, palmtop, or a tablet, relay communication device, or an internet access device, and combinations thereof. It is noted that while two wireless devices are illustrated in FIG. 1 as being in communication with the depicted access as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

In operation, access node 110 may establish communication with wireless devices 121 and 122 such that access node 110 provides the wireless devices access to a communication network (e.g., communication network 101). In an embodiment, system 100 may use a plurality of carriers in order to provide wireless communication services. For example, a plurality of carriers comprise bandwidth for wireless communications, for example, one or more carriers over a 2.5 GHz spectrum, a 1.25 GHz spectrum, a 1900 Mhz spectrum, an 800 Mhz spectrum, and the like. The carriers may include a plurality of channels, for example, 5 Mhz channels, 10 Mhz channels, 15 Mhz channels, and the like, that may further be divided into subcarriers. In an embodiment, a frequency band may comprise a carrier, a channel, a subcarrier, a plurality of any of these, or any other suitable frequency band.

Communication links 106, 107 can use various communication media, such as air, space, metal, optical fiber, twisted pair cable, coaxial cable or some other signal propagation path, including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format, including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to wireless devices 121, 122, such as control information, location, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
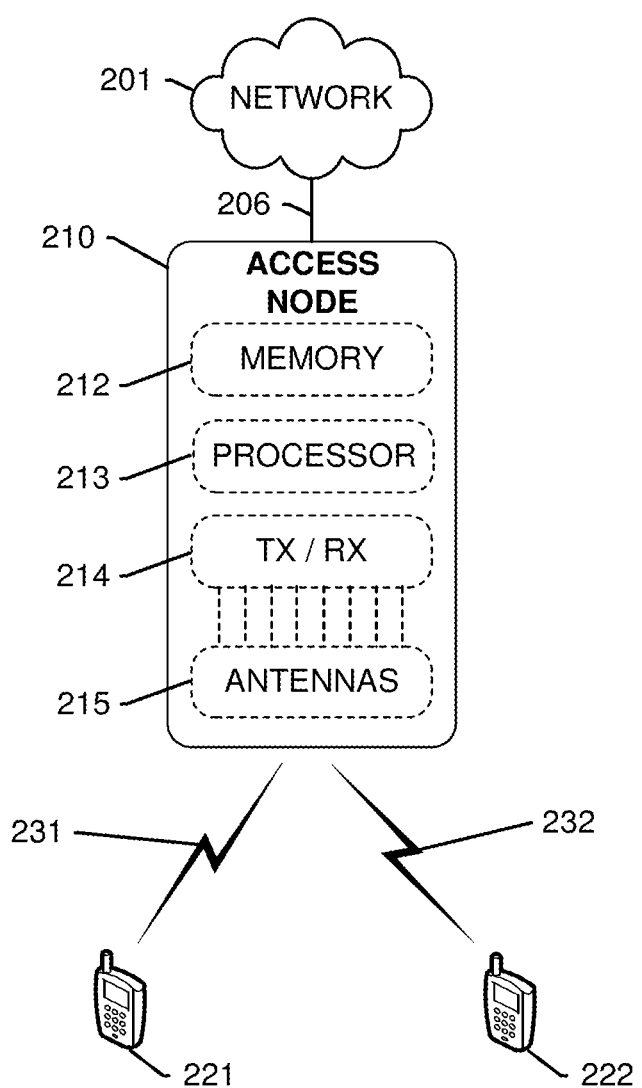
FIG. 2 is a diagram illustrating an access node according to an embodiment.

FIG. 2 depicts an example of an access node 210 for allocating resources in a wireless network. Access node 210 may be representative of access node 110 of FIG. 1, however embodiments are not limited thereto. Access node 210 is configured as an access point for providing network services from network 201 to end-user wireless devices 221, 222 via communication links 231, 232 respectively. Access node 210 is illustrated as comprising a memory 212 for storing logical modules that perform operations described herein, a processor 213 for executing the logical modules, and a transceiver 214 for transmitting and receiving signals via antennas 215. One or more antennas ports may connect the antennas 215 to the transceiver 214. Although only one transceiver is depicted in access node 210, additional transceivers may be incorporated in order to deploy Multiple Input Multiple Output (MIIMO) modes with wireless devices 221, 222, and to facilitate communication with other network nodes on network 201. Further, access node 210 is communicatively coupled to network 201 via communication interface 206, which may be any wired or wireless link as described above.

Figure 3:
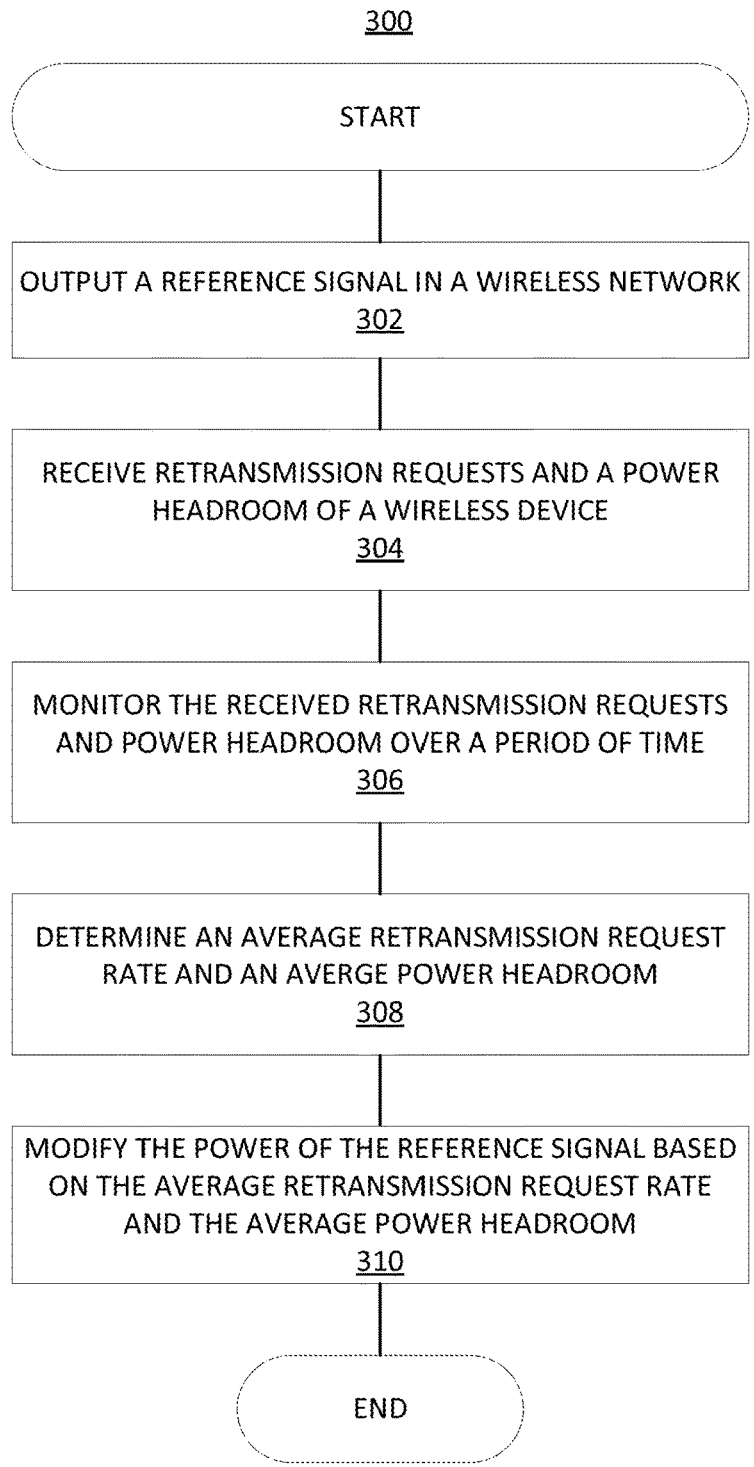
FIG. 3 is a diagram illustrating a method for controlling an access node based on wireless device power headroom and retransmission requests rate according to an embodiment.

FIG. 3 depicts an embodiment of a method 300 for dynamically controlling an access node, for example, an access node 110 and 210 of FIGS. 1 and 2, respectively, based on retransmission requests and power headroom of a wireless device. In an embodiment, the method 300 may include changing a reference signal power for a cell or a site based on an average retransmission request and power headroom of a wireless device. The method 300 may further include changing the reference signal power on a select sector of a cell. A sector may be a portion of a cell, and one or more access node antennas may provide one or more reference signals for one or more wireless devices within the given sector or cell. Power boosting of a one or more reference signals may cause interference or signal noise within a given sector or cell, or adjacent cell.

In operation 302 of method 300, the access node may output a reference signal in a wireless network. For example, a signal may be transmitted from an antenna of an access node within a physical downlink control channel (PDCCH).

In operation 304, the access node may receive retransmission requests and a power headroom of a wireless device, or wireless devices. A power headroom may be the difference between the transmit power of a wireless device and the maximum transmit power of the wireless device. The power headroom may represent the amount of surplus transmit power of a wireless device available to increase transmit power. For example, if the surplus transmit power is positive, then the wireless device may be able to send a signal with a higher transmit power. If the surplus transmit power is zero or negative, then the wireless device may be already transmitting at a maximum transmit power. The retransmission requests may be requests by a wireless device for retransmission of data sent by an access node, for example. The wireless device may request retransmission of data due to the sent data being corrupted upon receipt by the wireless device. The corruption may be caused by signal interference or signal noise.

As an example, signal interference, or signal noise, may be created by a plurality of wireless devices connected to the access node. For example, while power boosting the reference signal, a cell coverage area from an access node may be increased, increasing a number of wireless devices connected to the access node. As the number of wireless devices increase, the number of power boosted reference signals may increase. As the number of power boosted reference signals increase, interference and noise may increase. Due to the interference and noise from the traffic between the access node and the wireless devices, data packets received by a wireless device within a cell may be corrupted. The data packets may also be corrupted due to signal propagation or path loss. Signal path loss may be a reduction in power density as the signal propagates through space. In response to receiving a corrupted data packet, the wireless device may transmit a retransmission request for each corrupted data packet received. As an example, each wireless device within the cell may transmit a retransmission request upon receiving a corrupted data packet.

The access node may receive the surplus transmit power from a received power headroom report, as an example. In an embodiment, the power headroom report may comprise a value that corresponds to a power level difference between a current transmit power for the wireless device and the maximum transmit power for the device, measured in dB. As an example, the maximum uplink transmit power for wireless device may be established by a network administrator, a standard used for communications (e.g. LTE), or a local regulation, or any combination thereof, however, embodiments are not limited thereto.

In operation 306, the access node may monitor the received retransmission requests and power headroom over a period of time. As an example, the access node may monitor the received retransmission requests and the received surplus transmit power over a period of time set by a network operator.

In operation 308, based on the received retransmission requests and received power headroom over the period of time, the access node may determine an average retransmission request rate and an average power headroom.

In operation 310, based on the average retransmission request rate and average power headroom, the access node modifies the power of the reference signal. For example, in response to the average retransmission request rate meeting a first criteria and the average surplus transmit power meeting a second criteria, the access node may reduce the power of the reference signal. As example, in response to the average retransmission request being low and the average surplus transmit power being high, the access node may disable power boosting of the reference signal.

As an example, in response to the average retransmission request rate not meeting a first criteria and the average surplus transmit power not meeting a second criteria, the access node may enable or maintain power boosting of the reference signal. For example, in response to the average retransmission request being high and the average surplus transmit power being low, the access node may enable or maintain power boosting of the reference signal.

Figure 4:
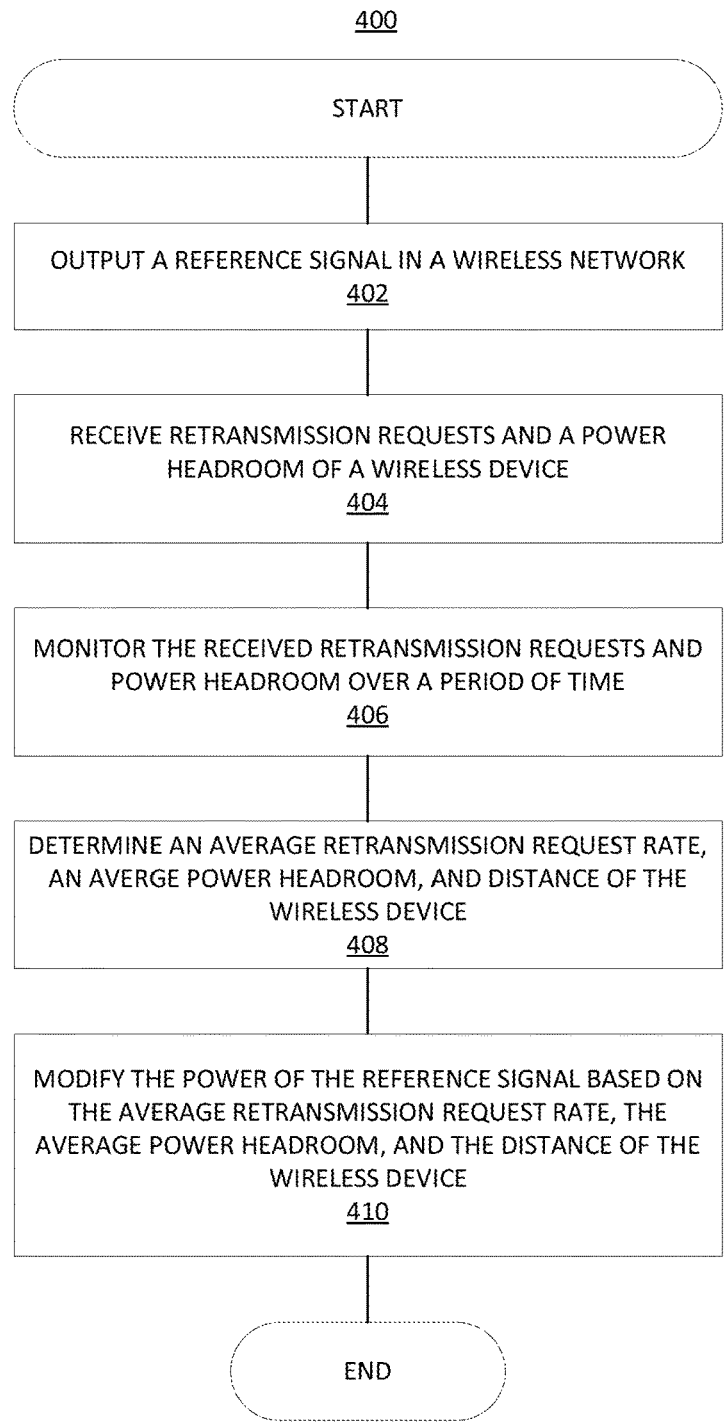
FIG. 4 is a diagram illustrating a method for controlling an access node based on wireless device power headroom, retransmission request rate, and distance according to an embodiment.

FIG. 4 depicts an embodiment of a method 400 for dynamically controlling an access node, for example, an access node 110 and 210 of FIGS. 1 and 2, respectively, based on retransmission requests, power headroom, and distance from an access node of a wireless device. In an embodiment, the method 400 may include changing a reference signal power for a cell or a site based on an average retransmission request and power headroom of a wireless device and a distance of the wireless device from the node. The method 400 may further include changing the reference signal power on a select sector of a cell. A sector may be a portion of a cell, and one or more node antennas may provide one or more reference signals, respectively, for one or more wireless devices within the given sector or cell.

In operation 402 of the method 400, the access node may output a reference signal in a wireless network. For example, a signal may be transmitted from an antenna of an access node within a physical downlink control channel (PDCCH).

In operation 404, the access node may receive retransmission requests and a power headroom of a wireless device, or wireless devices. For example, the wireless device may request retransmission of data because to the data may be corrupted upon receipt by the wireless device. The corruption may be caused by signal interference or signal noise.

In operation 406, the access node may monitor the received retransmission requests and power headroom over a period of time. As an example, the access node may monitor the received retransmission requests and the received surplus transmit power over a period of time set by a network operator.

In operation 408, based on the received retransmission requests and received power headroom over the period of time, the access node may determine an average retransmission request rate and an average power headroom. The access node may further determine a distance of the wireless device from the access node. As an example, the access node may determine the distance of the wireless from the access node through a received uplink signal from the wireless device.

In operation 410, based on the average retransmission request rate, average power headroom, and the distance between the wireless device and access node, the access node modifies the power of the reference signal. For example, in response to the average retransmission request rate meeting a first criteria, the average surplus transmit power meeting a second criteria, and the distance meeting a third criteria, the access node may reduce the power of the reference signal. For example, the access node may disable a power boosting of the reference signal in response to the retransmission request being low, the average surplus transmit power being high, and the distance being low. As an example, in response to the average retransmission request rate being high, the average surplus transmit power being low, and the distance being high, the access node may enable or maintain power boosting of the reference signal.

Figure 5:
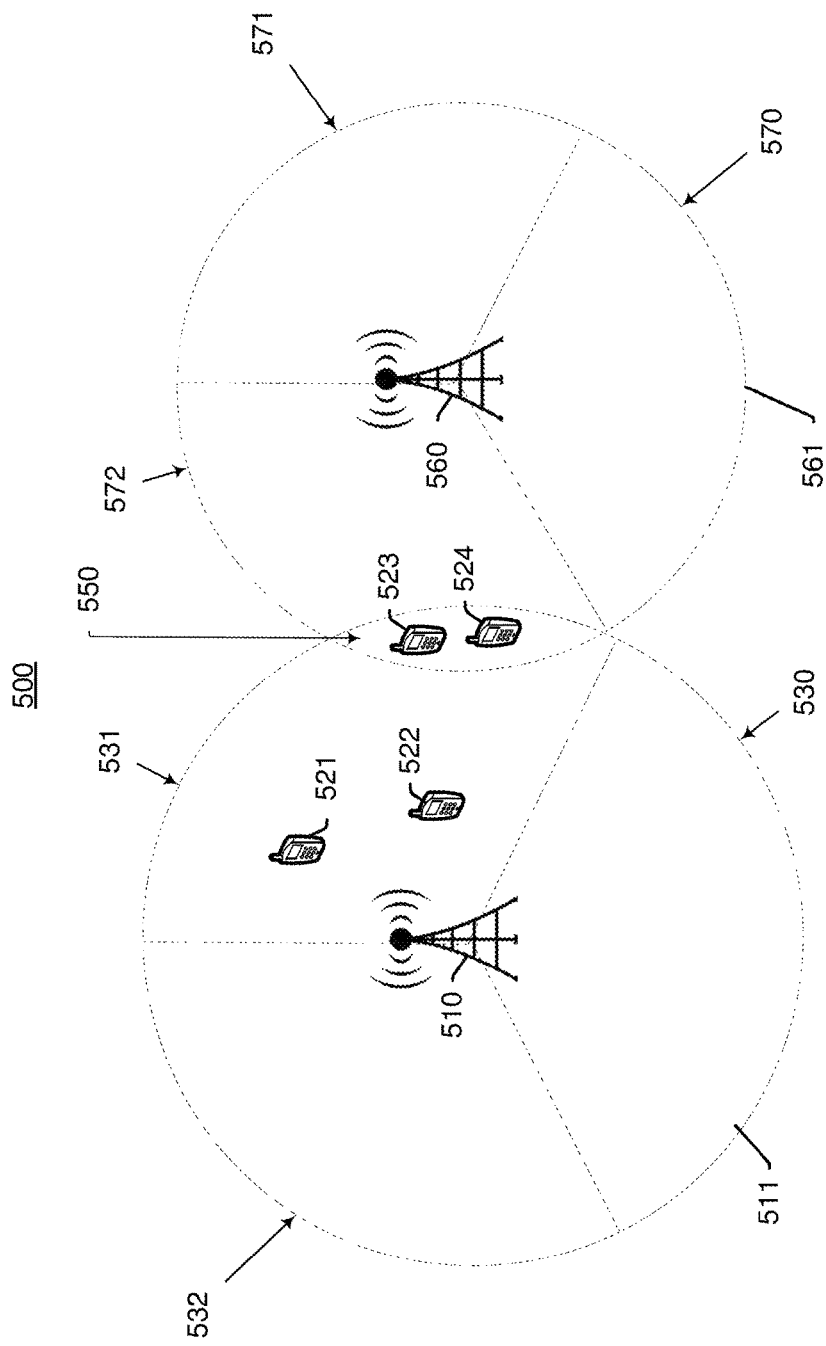
FIG. 5 is a diagram illustrating two cells of a wireless network having a plurality of sectors according to an embodiment.

FIG. 5 depicts a schematic of a wireless network 500 including cells 511 and 561 having coverage areas generated by access nodes 510 and 560. Access nodes 510 and 560 may be representative of access node 110 of FIG. 1 and access node 210 of FIG. 2, however, embodiments are not limited thereto. Cell 511 may be representative of a coverage area of an access node during power boosting of a reference signal. Cell 561 may be representative of a coverage area of an access node while power boosting of a reference signal is disabled. As depicted in FIG. 5, the coverage area of cell 511 may be larger than the coverage area of cell 561. Each cell 511 and 561 is divided into sectors 530, 531, 532, and 570, 571, 572, respectively. While FIG. 5 depicts only three sectors per cell 511 and 561, embodiments are not limited thereto. For example, the cells 511 and 561 may have less than three sectors or more than three sectors. A plurality of wireless devices 521, 522, 523, and 524 may be disposed within sector 531. While FIG. 5 depicts only four wireless devices, embodiments are not limited thereto. For example, the cell 511 may have less than four wireless devices or more than four wireless devices located in sectors 530, 531, or 532, or any combination thereof. Wireless devices 523 and 524 may be disposed within both sectors 531 and 572 in an overlap region 550.

As an example, signal interference, or signal noise, may be created within the overlap region 550 from the transmission signals created by access nodes 510 and 560. For example, while power boosting the reference signal, a cell 511 coverage area from access node 510 may be increased creating an overlap with cell 561 coverage area of access node 560. While access nodes 510 and 560 may be transmitting on different frequencies or channels, the signals from access nodes 510 and 560 may interfere with each other creating interference or signal noise. Due to the signal noise from two cell signals interfering with one another, the wireless devices 523 and 524 may increase transmission power to the access node 510 or 560. For example, wireless device 523 may be connected to access node 510 and wireless device 524 may connected to access node 560. Wireless device 523 and 524 may each be representative of a plurality of wireless devices, however, embodiments are not limited thereto.

Due to the noise from the traffic between the wireless devices and access nodes 510 and 560, the wireless devices 523 and 524 may increase transmission power to the access node 510 and 560, respectively. As the transmission power increases, interference and noise may further increase, thus corrupting data packets received by the plurality of wireless devices 521-524. In response to receiving a corrupted data packet, the wireless devices 521-524 may transmit a retransmission request for each corrupted data packet received. As an example, each wireless device 521-524 within the overlap region 550 may transmit a retransmission request upon receiving a corrupted data packet.

Figure 6:
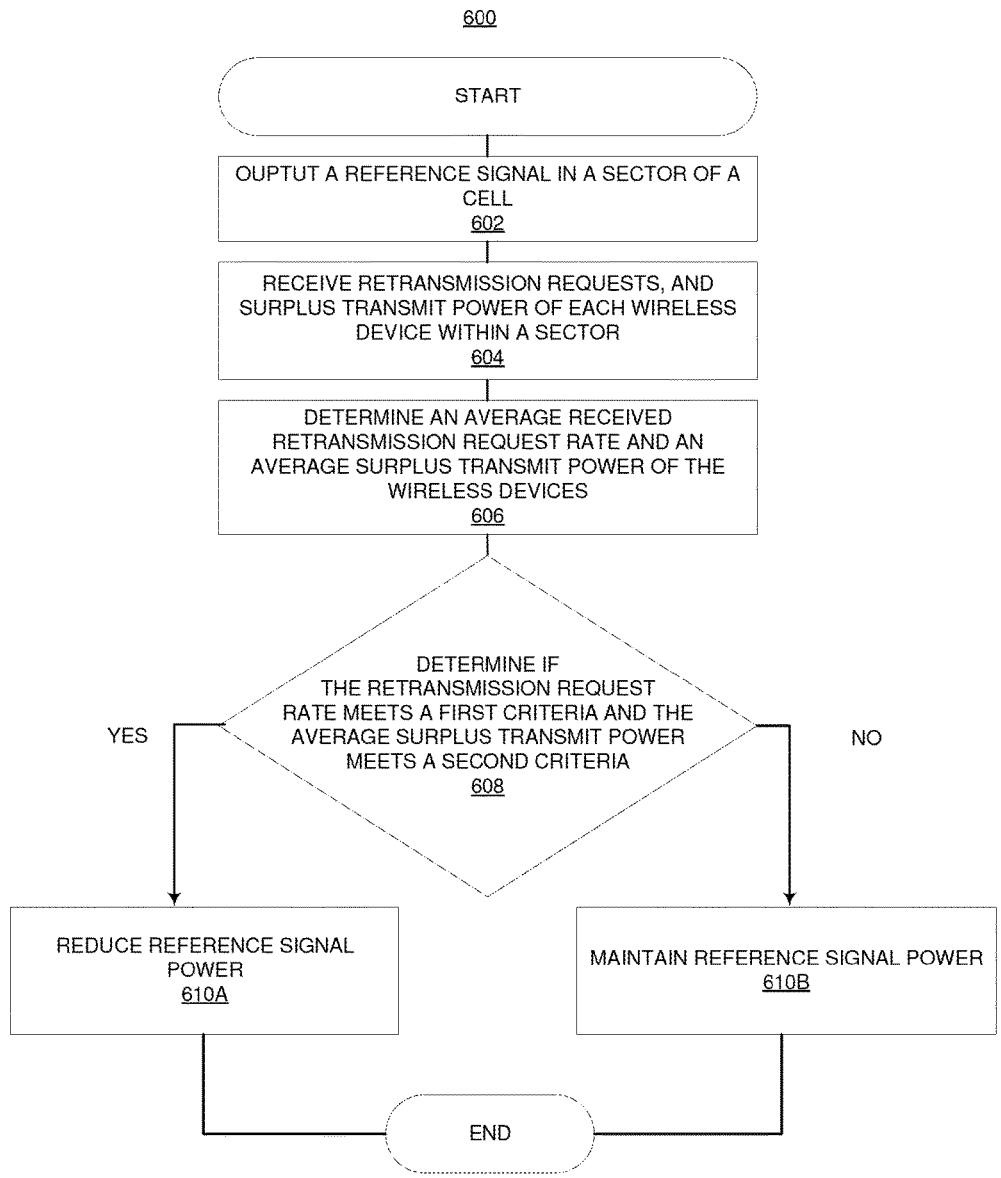
FIG. 6 is a diagram illustrating a method for controlling a sector of a cell of an access node based on wireless device power headroom and retransmission request rate according to an embodiment.

FIG. 6 depicts an embodiment of a method 600 for controlling an access node based on an average retransmission rate and an average power headroom of a plurality of wireless devices. For example, the access node and wireless devices may be representative of the access node 110 and wireless devices 121 and 122 of FIG. 1, access node 210 and wireless devices of 231 and 232 of FIG. 2 or access nodes 510 and 560 and wireless devices 521-424 of FIG. 5, however, embodiments are not limited thereto.

In an embodiment, the method 600 may include dynamically controlling the power of a reference signal in a select sector of a cell, or a site, based on an average retransmission rate and power headroom of the wireless devices. For example, the access node may determine a select sector of a cell includes a plurality of wireless devices. The node may receive from each wireless device a retransmission request, a surplus transmit power, and an uplink signal. The access node determines an average retransmission rate and average surplus transmit power of the plurality of wireless devices. In response to the average retransmission request being low, the average surplus transmit power being high, the access node may reduce a power of the reference signal.

In operation 602 of method 600, the access node may output a reference signal in a sector of a cell of a wireless network. For example, the access node may transmit the reference signal within a physical downlink control channel (PDCCH) through one or more antennas of the access node.

In operation 604, the access node may receive retransmission requests, and surplus transmit power, and an uplink signal from a plurality of wireless devices. As an example, the access node may receive the surplus transmit powers from received power headroom reports transmitted in an uplink signal from the plurality of wireless devices.

In operation 606, the access node may determine an average of the received retransmission requests and surplus transmit powers for a select sector. As an example, the retransmission requests and surplus transmit powers for a select sector may be sent by one or more wireless devices. As an example, the access node may also determine an average of the received retransmission rate and available transmit power over a period of time set by a network operator.

In operation 608, based on the determined average received retransmission requests and the determined average received surplus transmit power, the access node may determine whether the wireless devices' average retransmission requests meets a first criteria and average surplus power meets a second criteria. As an example, the access node determines the retransmission requests meets a first criteria if the average received retransmission request is low. The average received surplus transmit power meets a second criteria if the average received surplus transmit power is high, as an example only. The second criteria may be based on each wireless device, as an example. For example, the surplus transmit power of each wireless device may be normalized with respect to each wireless device's specifications. For example, surplus transmit power may be normalized into percentages of maximum transmit power of the wireless device. As an example, a wireless device may communicate a transmit power of 10% of maximum transmit power and a surplus transmit power of 90% of maximum transmit power, for example only. If the average received retransmission requests is low and the average received surplus transmission is high, the method continues to operation 610A. If the average received retransmission request is high and the average received surplus transmit power is low, the method continues of operation 610B.

In operation 610A, the access node may reduce the reference signal transmit power in response to a determination that the average retransmission request rate and average surplus transmit power of the wireless devices meet a first and second criteria, respectively. As an example, the access node may disable power boosting within a cell or sector of a cell of the access node by reducing the reference signal transmit power. By disabling the power boosting, signal interference and load may be reduced. Additionally, handoffs of wireless devices between cells may be enhanced.

For example, reducing the reference signal transmit power may reduce the coverage area of the cell 511 of FIG. 5. Reducing the coverage area of the cell 511 may eliminate overlap region 550 in FIG. 5, such that wireless devices 523 and 524 are only within cell 561 and, thus, handed off to access node 560. Handing off wireless devices 523 and 524 from access node 510 to access node 560 may reduce traffic, interference and noise within sector 531 of cell 511.

In operation 610B, the access node may maintain reference signal transmit power in response to the retransmission request rate and average surplus transmit power not meeting a first and second criteria, respectively. As an example, the access node may determine the retransmission request rate is low and average surplus transmit power is high.

Figure 7:
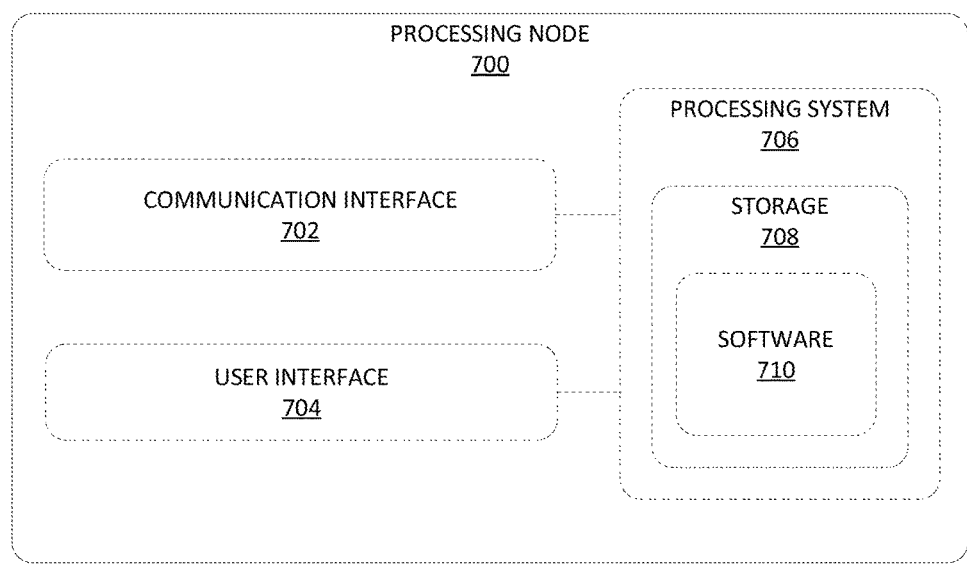
FIG. 7 is a diagram illustrating a processing node for optimizing an LTE transmit diversity implementation in a wireless network according to an embodiment.

FIG. 7 depicts an embodiment of a processing node for data transmission using frame reconfiguration comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a coherence determination module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The example systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmit paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of controlling reference signal power boosting at an access node, the method comprising:
    monitoring at an access node a received surplus transmit power and retransmission requests of a wireless device over a period of time;
    determining an average received surplus transmit power and an average retransmission request rate of the wireless device; and
    modifying a power of a reference signal in response to the average received surplus transmit power meeting a first criteria and the average retransmission request rate meeting a second criteria.

2. The method of claim 1, wherein the modifying the power of the reference signal comprises an increase or decrease in response to meeting the first criteria and second criteria.

3. The method of claim 1, wherein the determining the average received surplus transmit power and the average retransmission request rate comprises determining a number of retransmission requests and an amount of surplus transmit power over a period of time.

4. The method of claim 1, wherein the determining the average received surplus transmit power and the average retransmission request rate comprises determining an amount of surplus transmit power and a number of retransmission requests of one or more wireless devices within a cell.

5. The method of claim 1, wherein the surplus transmit power comprises a difference between a maximum transmit power of the wireless device and a transmit power of an uplink signal received from the wireless device.

6. The method of claim 1, further comprising determining a distance of the wireless device from the access node; and
    decreasing the power of the reference signal in further response to the distance meeting a third criteria.

7. The method of claim 1, further comprising initiating a power boosted reference signal.

8. A method of controlling a node, the method comprising:
    monitoring received surplus transmit powers and retransmission requests of a plurality of wireless devices within a sector;
    determining an average received surplus transmit power and an average retransmission request rate of the plurality of wireless devices within the sector; and
    in response to the average received surplus transmit power meeting a first criteria and the average retransmission request rate meeting a second criteria, decreasing a transmit power of a reference signal.

9. The method of claim 8, further comprising initiating power boosting of the reference signal output from the node within the sector.

10. The method of claim 8, wherein the surplus transmit power comprises a difference between a maximum transmit power of a wireless device of the plurality of wireless devices and a transmit power of an uplink signal received from the wireless device.

11. The method of claim 8, wherein the determining the average received surplus transmit power and the average retransmission request rate comprises determining a number of retransmission requests and an amount of surplus transmit power over a period of time.

12. The method of claim 8, wherein the surplus transmit power comprises:
    a difference between a transmit power of a wireless device and the maximum transmit power of the wireless device.

13. An access node comprising:
    a processor configured to:
        power boost a reference signal;
        determine an average received power headroom and average received retransmission request rate of wireless devices within a sector; and
        control the power boost of the reference signal within a sector in response to the average received power headroom meeting a first criteria and average received retransmission requests meeting a second criteria.

14. The access node of claim 13, wherein the processor is further configured control an antenna of the access node to disable the power boost of the reference signal in response to the average received power headroom meeting the first criteria and average received retransmission request rate meeting the second criteria.

15. The access node of claim 14, wherein disabling the power boost of the reference signal comprises reducing a transmit power of the reference signal.

16. The access node of claim 13, wherein the processor is further configured to monitor received surplus transmit powers and retransmission request rates of the wireless devices.

17. The access node of claim 13, wherein the controlling the power of the reference signal comprises an increase or decrease in response to the average received power headroom meeting the first criteria and average received retransmission request rate meeting the second criteria.

18. The access node of claim 13, wherein the determining the average received power headroom and the average retransmission request rate comprises determining an amount of surplus transmit power and a number of retransmission requests over a period of time.

19. The access node of claim 13, wherein the power headroom of a wireless device of the wireless devices within a sector comprises a surplus transmit power.

20. The access nod of claim 19, wherein the surplus transmit power comprises a difference between a transmit power of a wireless device and the maximum transmit power of the wireless device.

* * * * *